United States Patent
Bhavsar et al.

(10) Patent No.: US 12,339,131 B2
(45) Date of Patent: Jun. 24, 2025

(54) USING CONTEXT BASED MACHINE LEARNING FOR GENERATION OF CUSTOMIZED DRIVING OUTPUTS

(71) Applicant: Allstate Insurance Company, Northbrook, IL (US)

(72) Inventors: Chanakykumar Bhavsar, Naperville, IL (US); Surender Kumar, Palatine, IL (US); Matei Stroila, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/403,849

(22) Filed: Jan. 4, 2024

(65) Prior Publication Data

US 2024/0210191 A1    Jun. 27, 2024

Related U.S. Application Data

(63) Continuation of application No. 17/338,028, filed on Jun. 3, 2021, now Pat. No. 11,898,865.

(51) Int. Cl.
*G01C 21/34* (2006.01)
*G06F 18/2431* (2023.01)
*G06N 20/00* (2019.01)

(52) U.S. Cl.
CPC ..... *G01C 21/3484* (2013.01); *G06F 18/2431* (2023.01); *G06N 20/00* (2019.01)

(58) Field of Classification Search
CPC .. G01C 21/3484; G06N 20/00; G06F 18/2431
See application file for complete search history.

(56) References Cited

U.S. PATENT DOCUMENTS 9,849,887 B2   12/2017   Heath et al.
9,914,460 B2   3/2018    Hunt et al.
(Continued)

FOREIGN PATENT DOCUMENTS

DE   102014013960 A1   3/2016

OTHER PUBLICATIONS

Arumugam S., et al., "A Survey on Driving Behavior Analysis in Usage Based Insurance Using Big Data," Journal of Big Data, Springer Open, Sep. 25, 2019, Retrieved from the Internet: URL: https://journalofbigdata.springeropen.com/articles/10.1186/s40537-019-0249-5, 56 Pages.

(Continued)

*Primary Examiner* — Thomas E Worden
*Assistant Examiner* — Christopher A Buksa

(57) ABSTRACT

Aspects of the disclosure relate to using machine learning methods for customized output generation. A computing platform may train a model (using historical data) by classifying the historical data by a trip context, a device interaction context, and physical condition context, or a personality context, and training models using the classified historical data. The computing platform may monitor a data source system to collect new data, which may include information about multiple drivers. The computing platform may generate, by inputting the new data into the model, a customized driving output for a first driver, where the customized driving output is based at least in part on information about a second driver. The computing platform may send, to a computing device, the customized driving output and commands directing the computing device to display the customized driving output, which may cause the computing device to display the customized driving output.

20 Claims, 10 Drawing Sheets

(56) References Cited

U.S. PATENT DOCUMENTS

| | | |
|---|---|---|
| 10,065,652 B2 | 9/2018 | Shenoy et al. |
| 10,286,915 B2 | 5/2019 | Xiao et al. |
| 10,346,925 B2 | 7/2019 | Perl et al. |
| 10,672,249 B1 | 6/2020 | Balakrishnan et al. |
| 10,830,605 B1 | 11/2020 | Chintakindi et al. |
| 10,891,693 B2 | 1/2021 | Huang et al. |
| 11,014,578 B1 * | 5/2021 | Caprasecca .......... G08G 1/0967 |
| 2014/0322676 A1 | 10/2014 | Raman |
| 2015/0258996 A1 | 9/2015 | Victor et al. |
| 2016/0035152 A1 | 2/2016 | Kargupta |
| 2016/0110650 A1 | 4/2016 | Basir et al. |
| 2017/0210290 A1 | 7/2017 | Cordova et al. |
| 2018/0075380 A1 | 3/2018 | Perl et al. |
| 2019/0066535 A1 | 2/2019 | Pifko et al. |
| 2019/0102840 A1 | 4/2019 | Perl et al. |
| 2019/0387365 A1 | 12/2019 | Spruyt et al. |
| 2020/0074326 A1 | 3/2020 | Balakrishnan et al. |
| 2020/0104874 A1 | 4/2020 | Chintakindi et al. |

OTHER PUBLICATIONS

"Driving Pattern Risk Score: how do we build it?," Stemic Drive, Medium, May 5, 2020, Retrieved from the Internet: URL: https://stemicdrive.medium.com/driving-pattern-risk-core-how-do-we-build-it-778e8507635c, 7 Pages.

Lindow F., et al., "Driver Behavior Monitoring Based on Smartphone Sensor Data and Machine Learning Methods," Proceeding of the 25th Conference of Fruct Association, Retrieved from the Internet: URL: https://fruct.org/publications/fruct25/files/Lin.pdf on Mar. 18, 2021, pp. 196-203.

Moosavi S., et al., "Characterizing Driving Context from Driver Behavior," The Ohio State University, Retrieved from the Internet: URL: https:/larxiv.org/pdf/1710.05733.pdf on Nov. 17, 2017, Nov. 7-10, 2017, pp. 1-4.

Newkirk B., "IoT 'Behavior' Intelligence Saving Lives," Retrieved from the Internet: URL: LinkedIn, https://www.linkedin.com/pulse/motion-behavior-Intelligence-saving-lives-bob-newkirk on Jan. 22, 2021, pp. 1-4.

* cited by examiner

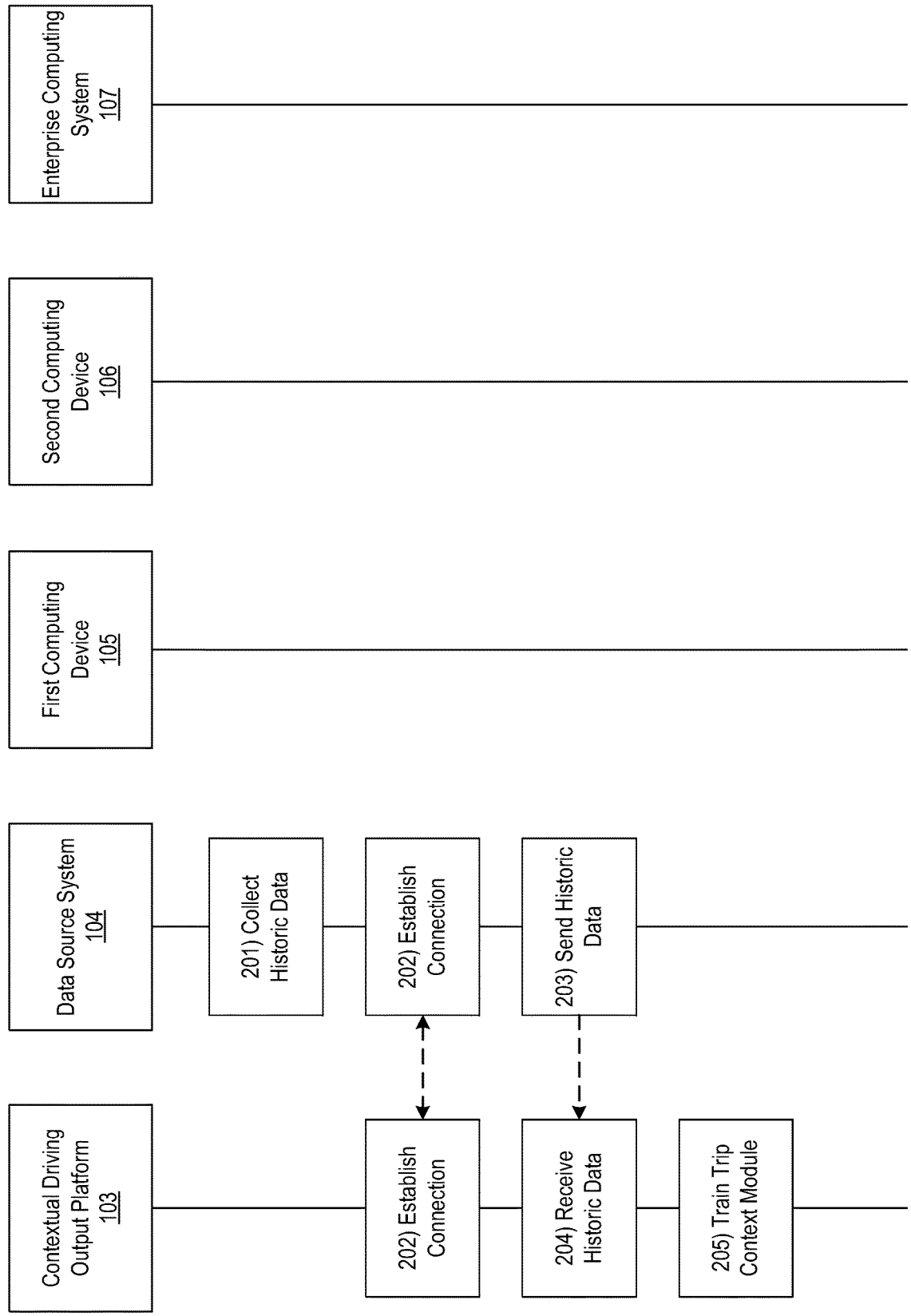

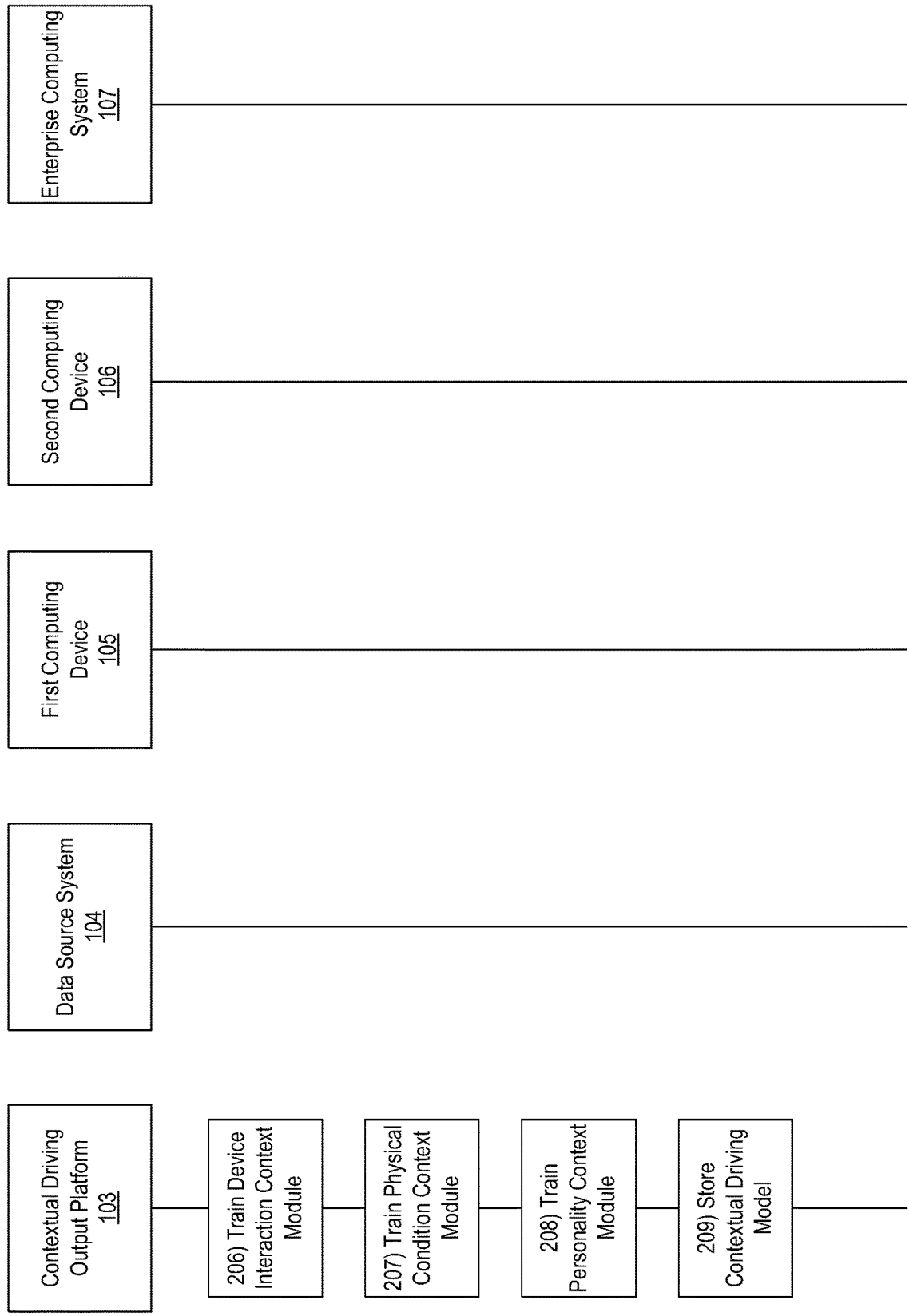

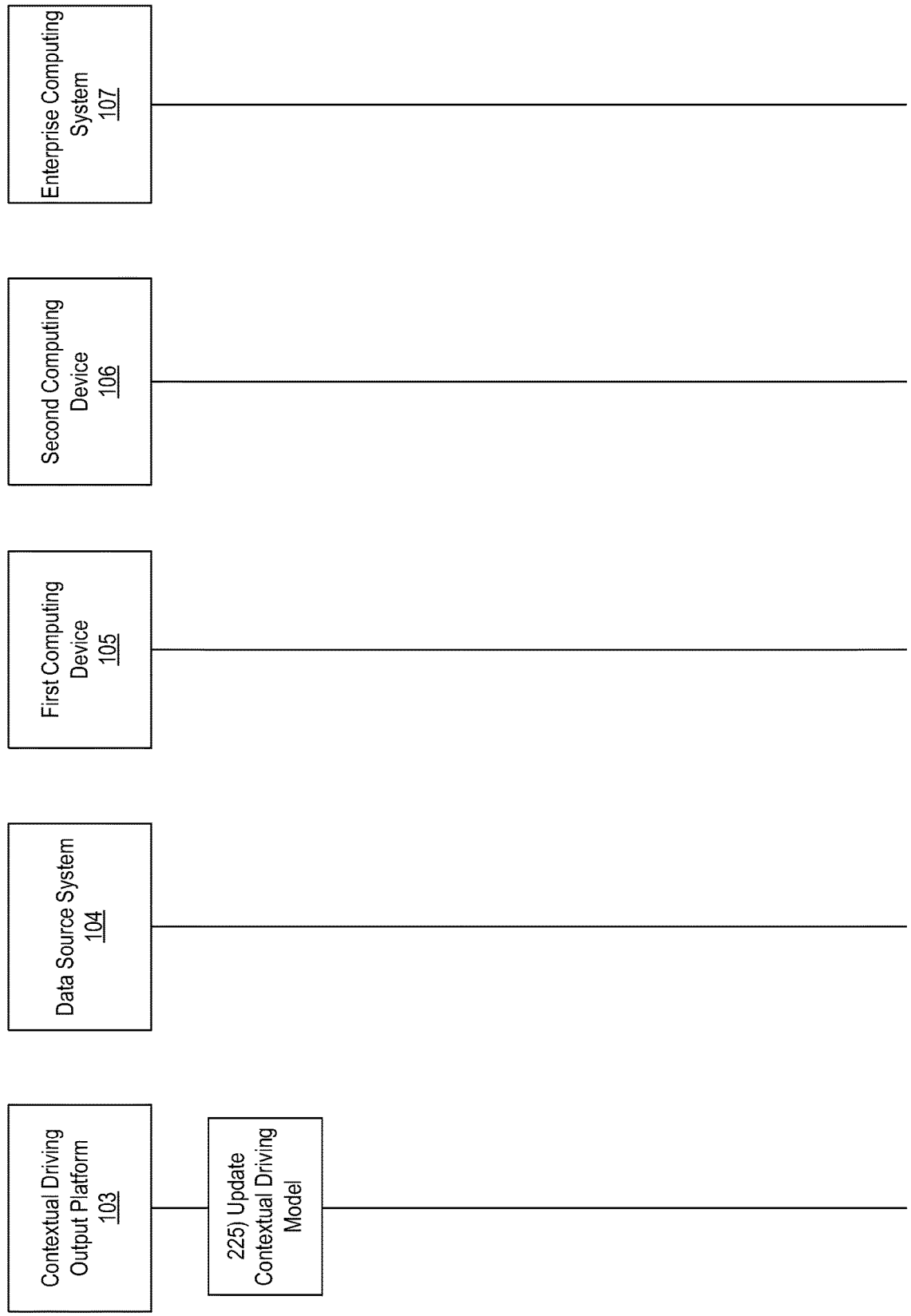

405

Contextual Driving Output

A nearby vehicle has been flagged as dangerous based on our holistic analysis of the driver in this context. We recommend shifting lanes to avoid the Black SUV to your right.

Contextual Driving Insight

Although this driver's maneuvers were somewhat erratic, the maneuvers were in response to our recommendation to avoid a potentially dangerous vehicle. Accordingly, rather than increasing the driver's rate, it should be decreased for following our proposed guidance.

FIG. 5

USING CONTEXT BASED MACHINE LEARNING FOR GENERATION OF CUSTOMIZED DRIVING OUTPUTS

CROSS-REFERENCE TO RELATED APPLICATIONS

The present application is a continuation of and claims priority to U.S. patent application Ser. No. 17/338,028 filed on Jun. 3, 2021, which is incorporated by reference in its entirety herein.

BACKGROUND

Aspects of the disclosure relate to processing systems. In particular, aspects of the disclosure relate to processing systems that train and apply machine learning models.

In some instances, enterprise organizations may use machine learning models to correlate risk with a driving trip. Such risk may be based, however, on a generic "one-size-fits-all" model, and thus might not result in the most accurate results for each individual or driving trip. This generic analysis may limit or otherwise impact the insights that such enterprise organizations are enabled to produce.

SUMMARY

Aspects of the disclosure provide effective, efficient, scalable, and convenient technical solutions that address and overcome the technical problems associated with incorporating context into the generation of customized driving outputs.

In accordance with one or more embodiments, a computing platform comprising at least one processor, a communication interface communicatively coupled to the at least one processor, and memory may train a machine learning model using historical data, where training the machine learning model includes: 1) classifying the historical data as corresponding to one or more of: a trip context, a device interaction context, a physical condition context, or a personality context corresponding to a driver or a passenger, and 2) training a model corresponding to one or more of the trip context, the device interaction context, the driver physical condition context, or the personality context, using the corresponding classified historical data. The computing platform may monitor a data source system to collect new data, which may include information from at least a first computing device corresponding to a first driver and a second computing device corresponding to one of: a second driver or a passenger of the first driver or the second driver. The computing platform may generate, by inputting the new data into the machine learning model, a customized driving output for the first driver, which may be based at least in part on the new data corresponding to the second driver. The computing platform may send, to the first computing device, the customized driving output for the first driver and one or more commands directing the first computing device to display the customized driving output for the first driver, which may cause the first computing device to display the customized driving output for the first driver.

In one or more instances, a subset of the historical data classified as corresponding to the trip context may include data indicating one or more of: frequency of difficult driving maneuvers on a route, a number of the difficult driving maneuvers on the route, a type of the difficult driving maneuvers on the route, other drivers' behavior, driving speed, vehicle movement information, vehicle stoppage information, road conditions (which may include road situations, such as a road being under construction), road type, type of route, trip duration, time, traffic conditions, weather conditions, or braking information. The subset of the historical data classified as corresponding to the trip context may include data corresponding to one or more of: a human driver, a human passenger, or a software agent programmed for autonomous driving. The first driver and the second driver may be one of: a human or a software agent programmed for autonomous driving.

In one or more examples, the computing platform may identify that trip context data is not available for the first driver and that trip context data is available for a passenger of a vehicle operated by the first driver. The computing platform may identify that the first driver and the passenger travel together during a percentage of driving trips that exceeds a predetermined threshold. Based on identifying that the percentage exceeds the predetermined threshold, the computing platform may use the trip context data for the passenger to train the machine learning model. In one or more instances, a subset of the historical data classified as corresponding to the device interaction context may include data indicating one or more of: a type of device, applications interacted with, actions performed within applications, or frequency of device interactions.

In one or more examples, a subset of the historical data classified as corresponding to the driver physical condition context may include data indicating one or more of: a sleep score, driver disability information, or vital signs of a driver. In one or more examples, a subset of the historical data classified as corresponding to the personality context may include data indicating one or more of: a personality based on driver social media behavior, a personality based on a historical risk score, or personality test result information.

In one or more instances, the computing platform may store the machine learning model by storing a comprehensive model configured to apply one or more of the trip context model, the device interaction context model, the driver physical condition context model, or the personality context model. In one or more instances, the first driver and the second driver may be within a predetermined distance of each other during a driving trip.

In one or more arrangements, generating the customized driving output for the first driver may include generating, based on an identified personality score for the second driver, the customized driving output for the first driver. In one or more arrangements, generating the customized driving output for the first driver may include generating, in real time, the customized driving output for the first driver.

In one or more instances, the computing platform may identify, using the machine learning model and based on the customized driving output for the first driver, one or more contextual driving insights indicating a modification to a rate corresponding to the first driver. The computing platform may send, to an enterprise computing system, the one or more contextual driving insights and one or more commands directing the enterprise computing system to modify the rate corresponding to the first driver based on the one or more contextual driving insights, which may cause the enterprise computing system to modify the rate corresponding to the first driver based on the one or more contextual driving insights.

In one or more examples, the computing platform may input the new data into the machine learning model by: 1) classifying the new data for analysis by one or more of the trip context model, the device interaction context model, the driver physical condition context model, or the personality context model, and 2) analyzing the classified new data using the corresponding model. In one or more examples, one or more of the trip context model, the device interaction context model, the driver physical condition context model, or the personality context model may be uniquely weighted within the machine learning model to generate the customized driving output.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for using context based machine learning for generation of customized driving outputs in accordance with one or more example embodiments;

FIGS. 4 and 5 depict illustrative graphical user interfaces for using context based machine learning for generation of customized driving outputs in accordance with one or more example embodiments.

DETAILED DESCRIPTION

Figure 1A:
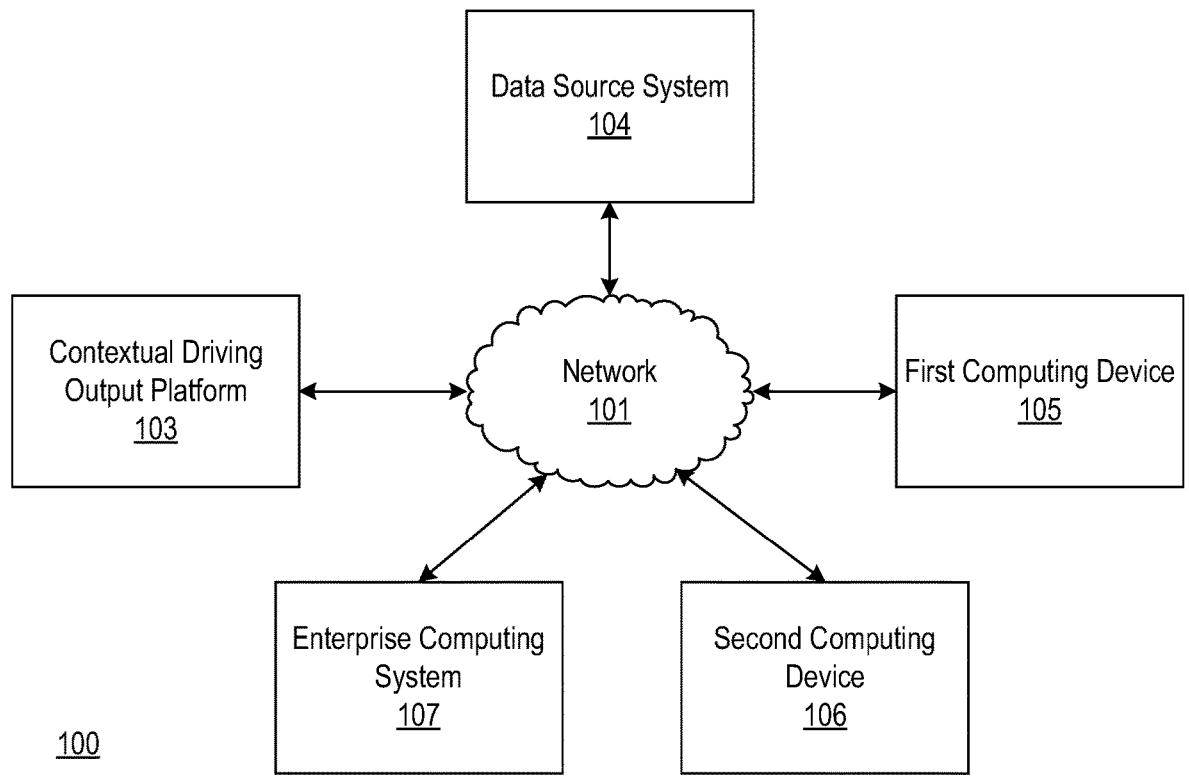
FIGS. 1A and 1B depict an illustrative computing environment for using context based machine learning for generation of customized driving outputs in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further below, systems and methods for contextual driving analysis and insight/output generation are described. For example, the risks and likelihood of accidents while driving may significantly change based on contextual situations/circumstances. More specifically, driving experiences may be impacted by multiple contexts like trip, device interactions, personality/social media, driver physical condition, and/or other contexts. Such contexts may include information indicating difficult driving maneuvers, deteriorating weather, increased traffic, interactions with multiple devices while driving, underlying health conditions (which may also be combined driving a difficult route), inappropriate/aggressive behavior on social media (which may e.g., reflect reckless/aggressive driving tendencies), and/or other information. Accordingly, the frequency and different combinations of such context may increase the magnitude of driving risk. Drivers might not be aware of how different contextual situations impact his or her trip and/or how he or she may avoid possible delays/incidents during the trip. In some instances, this contextual information may be used to create personalized experiences and/or reduce auto insurance claims.

In light of the impact that context has on driver risk scoring, the systems and methods described herein provide for context-based driver risk scoring and alerting. As described herein, the use of analytics like machine learning models and graph technology may be used to predict risks based on user engagement in different contexts. At a high level, this method includes, generating a driver risk score based on various contextual situations/circumstances during historical past trips and generating a trips feedback report for the driver that includes various context matrices and charts. In some instances, the feedback may also be provided in terms of real time alerts while driving based on the context the driver is expected to be in while driving. In addition, tips or recommendations may be provided to the driver by different contexts for safer and convenient future trips. These tips may be presented as general risks and alerts based on the historical data analysis from all the drivers in that context. In some instances, the tips might also be personalized for the driver based on the driver's past behavior in that context. The machine learning model may learn based on new data collected (e.g., accidents/violation occurred/avoided with difficult maneuvers by the driver), and the recommendations may evolve accordingly.

Furthermore, contextual situations may be simulated (e.g., if I drive to a certain place, like New York from Chicago, what is my risk of having an incident depending on contextual situations (e.g., weather, time of day, how tired I am)) and a risk measure for such a trip may be provided. Furthermore, education/training models may be provided for contextual situations. For example, a driving style may be suggested to student drivers based on contextual situations. Additionally or alternatively, driving styles, estimated risks, and/or feedback may be provided when driving in totally new contextual situations (e.g., a foreign country, a different side of the road, traffic rules, or the like).

In some instances, data collection and processing may happen on a user device (e.g., edge processing) depending on user preferences for privacy considerations. Further, in some instances, anonymized data (e.g., persona/aggregate features) may be sent to the cloud for analytics for model development (e.g., rather than personalized data).

Recommendations based on levels of expertise and driver familiarity with the context may be provided. This service may be useful for trip planning (e.g., what is the risk depending on the trip data—where, when, who, or the like) and/or for purchasing travel insurance. In some instances, a travel assistance application may be provided that details risk factors and ways to mitigate them.

In some instances, social media data may be used to derive a persona of a user (e.g., processing for this may happen at the user device). Persona based personalized trips may also be provided (e.g., personalized recommendations/alerts based on the persona).

Context based driver risk scoring and alerting may involve collection and use of various data including but not limited to using connecting car features, global positioning system (GPS) information, location information, traffic feeds, social media activity, driving history, driver interaction with devices, weather feeds, or the like, and may leverage relationships in this data using graph technology and/or machine learning.

This process may largely be separated into two sub-processes: 1) identify and classify driver activities with respect to contexts, and 2) monitor, process, and report context matrices and offer real-time alerts/recommendations to prevent accidents and/or provide other information/services. With regard to the first sub-process, with user consent, data may be collected for various activities and classified as part of a trip context, a device interaction context, a driver physical condition context, and/or a personality/persona context. Using analytics (e.g., machine learning models and/or graph analytics) a weighted value may be assigned to each context based on frequency and relation with other contexts. Examples of data classified under the trip context include frequency, number, and/or type of difficult driving maneuvers on a route, other drivers' behavior on a trip, driving speed, car movement/stoppage information, road situations (e.g., under construction, or the like), road type, route (local or speedways), trip duration (long, medium, or short), time of day/night, traffic information, weather information, braking information, and/or other contextual trip information. Examples of data classified under the device interaction context include one or more of: type of device interactions (e.g., cell phone, GPS device, car Bluetooth phone, laptop, tablet, or the like), type of applications interacted with (e.g., Facebook, TikTok, WhatsApp, or the like), types of interaction within applications (e.g., post, message, tweet, camera, voice call, video chat, or the like), frequency of device interactions, and/or other device interaction information. Examples of data classified under the driver's physical condition context may include a sleep score, special conditions like physical disabilities (e.g., reported by a driver), driver vital signs (e.g., blood pressure, temperature, or the like), and/or other physical condition information. Examples of data classified under the personality/persona context may include a personality trait, characteristic, attribute or the like (e.g., a full personality or personality type) based on driver social media behavior (e.g., aggressive social media behavior such as posting offensive content or language may indicate an aggressive personality), a historical risk score (e.g., personality may reflect the way people behave in social media and in real life), personality traits (e.g., driving style may be influenced by their personality traits as defined by a personality test/evaluation such as Big Five, Myers Briggs, or the like), and/or other personality/persona information.

With regard to the second sub-process, live trip data may be integrated with past trips under various contexts. In addition, a driver risk score may be generated using context-based weightage and frequency. Furthermore, a trips feedback report may be generated for a driver with various context matrices and charts. For example, a feedback report may be provided to a driver informing him or her about factors impacting driving experience. This report may be on-demand, at the beginning/end of a trip, and/or on a weekly/daily/monthly basis as opted by a driver. Additionally or alternatively, voice alerts may be provided during a trip for any red flag (e.g., multiple interactions on a phone).

Further benefits provided by the systems and methods described herein may include one of more of: 1) personalized tips for safer and convenient future trips by simulating different context, past destinations, time of day, or the like, 2) generating context-based driver personas using social media activities, past trips, or the like on a driver device to protect data privacy, 3) training models for new contextual situations (e.g., student drivers, international travelers, or the like), 4) personalized context based reports, alerts, features, and/or personas through travel assistance application to help drivers mitigate various risks, improvise driving experiences, and efficiently plan future trips, and 5) discounts if personalized recommendations/alerts based on persona/context are acted upon and/or discounts on usage based insurance.

Figure 1B:
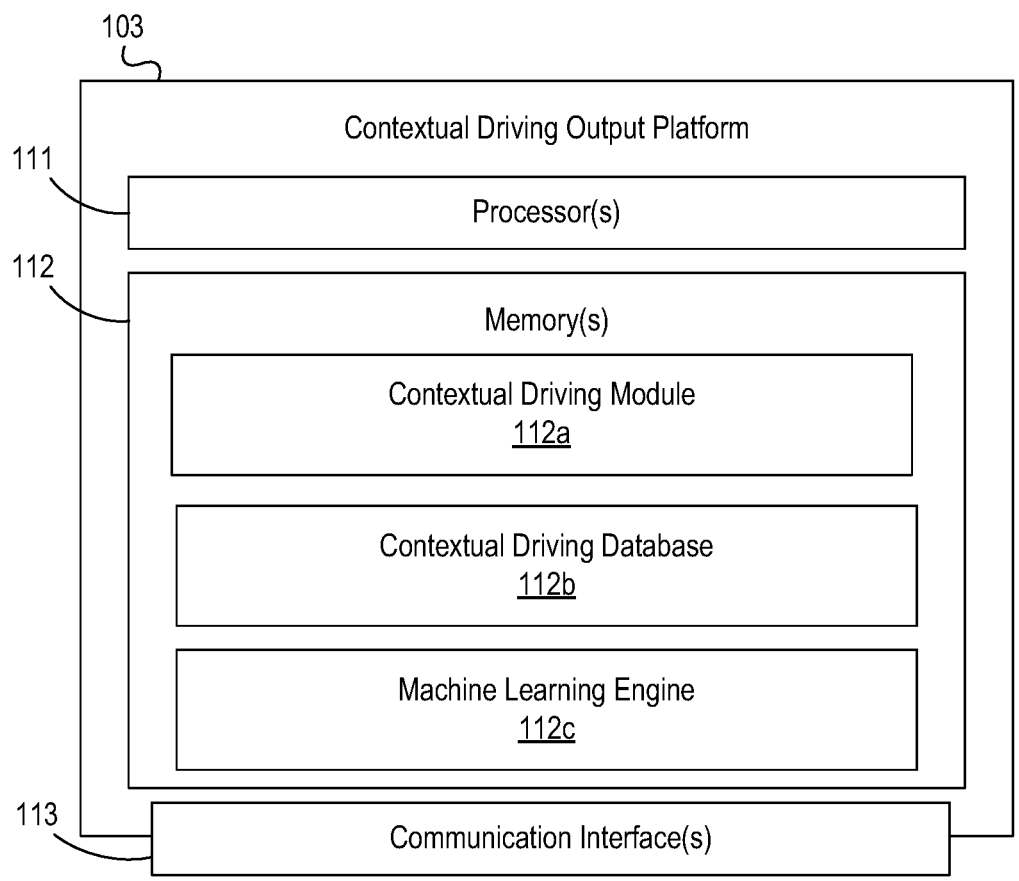

FIGS. 1A and 1B depict an illustrative computing environment for using context based machine learning for generation of customized driving outputs in accordance with one or more example embodiments. Referring to FIG. 1A, computing environment 100 may include one or more computer systems. For example, computing environment 100 may include contextual driving output platform 103, data source system 104, first computing device 105, second computing device 106, and enterprise computing system 107.

As illustrated in greater detail below, contextual driving output platform 103 may include one or more computing devices configured to perform one or more of the functions described herein. For example, contextual driving output platform 103 may include one or more computers (e.g., laptop computers, desktop computers, servers, server blades, or the like) and/or other computer components (e.g., processors, memories, communication interfaces). In addition, and as illustrated in greater detail below, contextual driving output platform 103 may be configured to apply one or more machine learning methods to train and deploy models for contextual driving analysis and/or generation of customized driving outputs/insights.

Data source system 104 may be or include one or more computing devices (e.g., servers, server blades, and/or other devices) configured to store historical and current data related to a trip context, device interaction context, physical condition context, personality context, and/or other context. For example, data source system 104 may be configured to store data indicating one or more of: frequency, number, and/or type of difficult driving maneuvers on a route, other drivers' behavior on a trip, driving speed, car movement/stoppage information, road situations (e.g., under construction, or the like), road type, route (local or speedways), trip duration (long, medium, or short), time of day/night, traffic information, weather information, braking information, type of device interactions (e.g., cell phone, GPS device, car Bluetooth phone, laptop, tablet, or the like), type of applications interacted with (e.g., Facebook, TikTok, WhatsApp, or the like), types of interaction within applications (e.g., post, message, tweet, camera, voice call, video chat, or the like), frequency of device interactions, sleep scores, special conditions like physical disabilities (e.g., reported by a driver), driver vital signs (e.g., blood pressure, temperature, or the like), a personality based on driver social media behavior, a historical risk score (e.g., personality may reflect the way people behave in social media and in real life), personality traits (e.g., driving style may be influenced by their personality traits as defined by a personality test/evaluation such as Big Five, Myer Briggs, or the like), and/or other contextual information.

First computing device 105 may be or include one or more computing devices (e.g., smartphone, camera, telematics sensors, driving control/other vehicle system, weather/temperature sensors, tablet, desktop computer, laptop computer, or other personal computing device) that may collect (e.g., with appropriate permission of the user) contextual data (e.g., related to a trip context, device interaction context, physical condition context, personality context, and/or other context) for a user (e.g., a customer of an enterprise organization, such as an insurance provider). In some instances, the first computing device 105 may be used to display customized/contextual driving outputs/insights and/or other alerts/graphical user interfaces. In some instances, the first computer device 105 may be operated by or otherwise affiliated with a first user.

Second computing device 106 may be or include one or more computing devices (e.g., smartphone, camera, telematics sensors, driving control/other vehicle system, weather/temperature sensors, tablet, desktop computer, laptop computer, or other personal computing device) that may collect (e.g., with permission of the user) contextual data (e.g., related to a trip context, device interaction context, physical condition context, personality context, and/or other context) for a user (e.g., a customer of an enterprise organization, such as an insurance provider). In some instances, the second computing device 106 may be used to display customized/contextual driving outputs/insights and/or other alerts/graphical user interfaces. In some instances, the second computer device 106 may be operated or otherwise affiliated with a second user (e.g., different than the first user). For example, the second computing device 106 may correspond to a driver or passenger of a different vehicle.

Enterprise computing system 107 may be or include one or more computing devices (e.g., smartphone, tablet, desktop computer, laptop computer, server, server blade, or other personal computing device) that may be used by a user (e.g., an employee of an enterprise organization, such as an insurance provider), and may be used to generate and/or display customized driving insights (e.g., reductions/increases to premiums or rates, and/or other financial incentives based on contextualized driving analysis). In some instances, the enterprise computing system 107 may be used to display customized/contextual driving outputs/insights and/or other alerts/graphical user interfaces.

Computing environment 100 also may include one or more networks, which may interconnect one or more of contextual driving output platform 103, data source system 104, first computing device 105, second computing device 106, enterprise computing system 107 and/or one or more other systems, public networks, sub-networks, and/or the like. For example, computing environment 100 may include a network 101.

In one or more arrangements, contextual driving output platform 103, data source system 104, first computing device 105, second computing device 106, enterprise computing system 107, and/or the other systems included in computing environment 100 may be any type of computing device capable of receiving a user interface, receiving input via the user interface, and/or communicating the received input to one or more other computing devices. For example, the systems included in computing environment 100 may, in some instances, be and/or include server computers, desktop computers, laptop computers, tablet computers, smart phones, cameras, telematics sensors, driving control/other vehicle systems, or the like that may include one or more processors, memories, communication interfaces, storage devices, and/or other components. As noted above, and as illustrated in greater detail below, any and/or all of contextual driving output platform 103, data source system 104, first computing device 105, second computing device 106, and/or enterprise computing system 107 may, in some instances, be special-purpose computing devices configured to perform specific functions.

Referring to FIG. 1B, contextual driving output platform 103 may include one or more processors 111, memory 112, and communication interface 113. A data bus may interconnect processor 111, memory 112, and communication interface 113. Communication interface 113 may be a network interface configured to support communication between contextual driving output platform 103 and one or more networks (e.g., network 101, or the like). Memory 112 may include one or more program modules having instructions that when executed by processor 111 cause contextual driving output platform 103 to perform one or more functions described herein and/or one or more databases that may store and/or otherwise maintain information which may be used by such program modules and/or processor 111. In some instances, the one or more program modules and/or databases may be stored by and/or maintained in different memory units of contextual driving output platform 103 and/or by different computing devices that may form and/or otherwise make up contextual driving output platform 103. For example, memory 112 may have, store, and/or include a contextual driving module 112a, a contextual driving database 112b, and a machine learning engine 112c. Contextual driving module 112a may have instructions that direct and/or cause contextual driving output platform 103 to train, maintain, and deploy a machine learning model for contextual driving analysis and output/insight generation, as discussed in greater detail herein. Contextual driving database 112b may store information (e.g., alert information, user input data labels, or the like) used by contextual driving module 112a and/or contextual driving platform 103 in training, maintaining, and deploying a machine learning model for contextual driving analysis, output/insight generation, and/or in performing other functions. Machine learning engine 112c may have instructions that direct and/or cause the contextual driving output platform 103 to perform contextual driving analysis, generate outputs/insights, and to set, define, and/or iteratively refine optimization rules, techniques and/or other parameters used by contextual driving output platform 103 and/or other systems in computing environment 100.

Figure 2C:
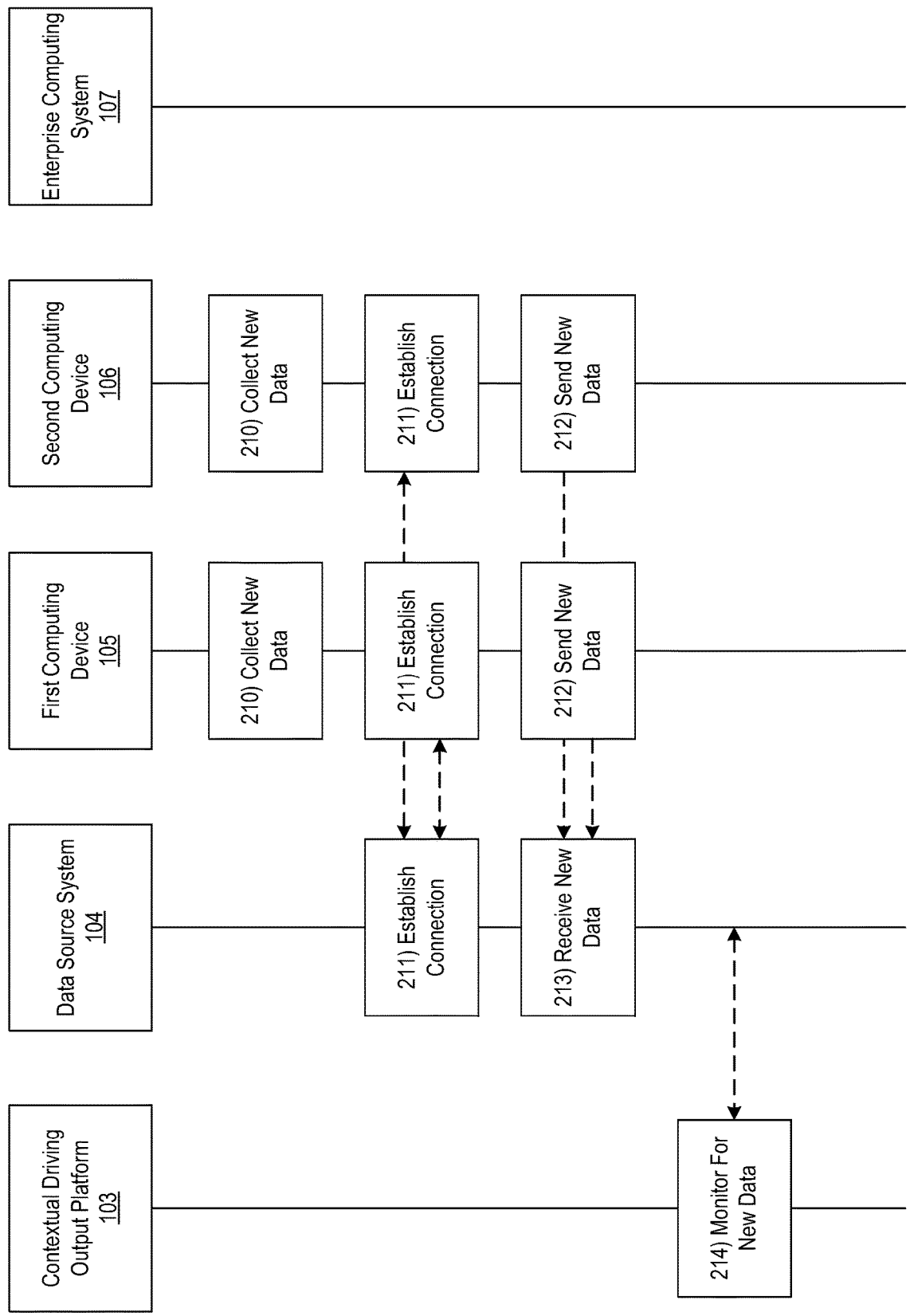

FIGS. 2A-2F depict an illustrative event sequence for using context based machine learning for generation of customized driving outputs in accordance with one or more example embodiments. Referring to FIG. 2A, at step 201, the data source system 104 may collect historical data from a plurality of computing devices corresponding to different drivers and/or passengers (e.g., first computing device 105, second computing device 106, and/or other computing devices), which may be indicative of driving context. For example, the data source system 104 may collect data indicating one or more of: frequency, number, and/or type of difficult driving maneuvers on a route, other drivers' behavior on a trip, driving speed, car movement/stoppage information, road situations (e.g., under construction, or the like), road type, route (local or speedways), trip duration (long, medium, or short), time of day/night, traffic information, weather information, braking information, type of device interactions (e.g., cell phone, GPS device, car Bluetooth phone, laptop, tablet, or the like), type of applications interacted with (e.g., Facebook, TikTok, WhatsApp, or the like), types of interaction within applications (e.g., post, message, tweet, camera, voice call, video chat, or the like), frequency of device interactions, sleep scores, special conditions like physical disabilities (e.g., reported by a driver), driver vital signs (e.g., blood pressure, temperature, or the like), a personality based on driver social media behavior, a historical risk score (e.g., personality may reflect the way people behave in social media and in real life), personality traits (e.g., driving style may be influenced by their personality traits as defined by a personality test/evaluation such as Myers-Briggs®, or the like), and/or other contextual information. In some instances, the data source system 104 may limit the collection of such historical data to a predetermined historical period (e.g., going back one hour, one day, one week, one month, one year, or other time period).

At step 202, the data source system 104 may establish a connection with the contextual driving output platform 103. For example, the data source system 104 may establish a first wireless data connection with the contextual driving output platform 103 to link the data source system 104 to the contextual driving output platform 103 (e.g., in preparation for sending the historical data). In some instances, the data source system 104 may identify whether or not a connection is already established with the contextual driving output platform 103. If a connection is already established, the data source system 104 might not re-establish the connection. If a connection is not yet established with the contextual driving output platform 103, the data source system 104 may establish the first wireless data connection as described herein.

At step 203, the data source system 104 may send the historical data (e.g., collected at step 201) to the contextual driving output platform 103. For example, the data source system 104 may send data indicating one or more of: frequency, number, and/or type of difficult driving maneuvers on a route, other drivers' behavior on a trip, driving speed, car movement/stoppage information, road situations (e.g., under construction, or the like), road type, route (local or speedways), trip duration (long, medium, or short), time of day/night, traffic information, weather information, braking information, type of device interactions (e.g., cell phone, GPS device, car Bluetooth phone, laptop, tablet, or the like), type of applications interacted with (e.g., Facebook, TikTok, WhatsApp, or the like), types of interaction within applications (e.g., post, message, tweet, camera, voice call, video chat, or the like), frequency of device interactions, sleep scores, special conditions like physical disabilities (e.g., reported by a driver), driver vital signs (e.g., blood pressure, temperature, or the like), a personality based on driver social media behavior, a historical risk score (e.g., personality may reflect the way people behave in social media and in real life), personality traits (e.g., driving style may be influenced by their personality traits as defined by a personality test/ evaluation such as Big Five, Myers Briggs, or the like), and/or other contextual information. In some instances, the data source system 104 may send the historical data to the contextual driving output platform 103 while the first wireless data connection is established.

At step 204, the contextual driving output platform 103 may receive the historical data sent at step 203. For example, the contextual driving output platform 103 may receive the historical data via the communication interface 113 and while the first wireless data connection is established.

At step 205, the contextual driving output platform 103 may train a trip context model (which may e.g., be part of a contextual driving model). For example, the contextual driving output platform 103 may identify a first subset of the historical data that is indicative of trip context (e.g., data indicating frequency, number, and/or type of difficult driving maneuvers on a route, other drivers' behavior, driving speed, vehicle movement information, vehicle stoppage information, road conditions (which may include road situations, such as a road being under construction), road type, type of route, trip duration, time, traffic conditions, weather conditions, braking information, and/or other contextual trip data), and may use this first subset of the historical data to train the trip context model to identify a trip context corresponding to input data (e.g., classify the first subset of the historical data as indicative of trip context). In some instances, in training the trip context model, the contextual driving output platform 103 may train one or more supervised learning algorithms using the first subset of the historical data, which may be labelled with a user identifier (e.g., to identify a particular driver associated with each data point). By training this trip context model, the contextual driving output platform 103 may enable output/insight generation in view of a particular context corresponding to a given driving trip.

In some instances, the first subset of the historical data may correspond to one or more of: human drivers, human passengers, or software agents programmed for autonomous driving (e.g., any of which may correspond to a particular vehicle and/or other nearby vehicle). In some instances, the contextual driving output platform 103 may identify that trip context data is not available for a particular driver, but may identify that the particular driver travels with a particular passenger during a percentage of trips that exceeds a predetermined threshold (e.g., a spouse or family member that frequently travels with an individual), and that trip context data is available for the passenger. For example, the contextual driving output platform 103 may identify, using GPS data corresponding to the driver and the passenger, that the two individuals travel together 90% of the time. The contextual driving output platform 103 may compare this percentage to a predetermined threshold percentage (e.g., 75%). In this example, because 90% exceeds 75%, the contextual driving output platform 103 may identify that trip context data for the passenger may be used to represent trip context data for the driver in training the trip context model.

Referring to FIG. 2B, at step 206, the contextual driving output platform 103 may train a device interaction context model (which may e.g., be part of a contextual driving model). For example, the contextual driving output platform 103 may identify a second subset of the historical data that is indicative of a device interaction context (e.g., data indicating a type of device, applications interacted with, actions performed within applications, frequency of device interactions, and/or contextual device interaction data), and may use this second subset of the historical data to train the device interaction context model to identify a device interaction context corresponding to input data (e.g., classify the second subset of the historical data as corresponding to the device interaction context). In some instances, in training the device interaction context model, the contextual driving output platform 103 may train one or more supervised learning algorithms using the second subset of the historical data, which may be labelled with a user identifier (e.g., to identify a particular driver associated with each data point). By training this device interaction context model, the contextual driving output platform 103 may enable output/ insight generation in view of a particular context corresponding to a type/amount of device interaction.

At step 207, the contextual driving output platform 103 may train a physical condition context model (which may e.g., be part of a contextual driving model). For example, the contextual driving output platform 103 may identify a third subset of the historical data that is indicative of a driver physical condition context (a sleep score, driver disability information, or vital signs of a driver), and may use this third subset of the historical data to train the physical condition context model to identify a driver's physical condition based on input data (e.g., classify the third subset of the historical data as corresponding to the driver physical condition context). In some instances, in training the physical condition context model, the contextual driving output platform 103 may train one or more supervised learning algorithms using the third subset of the historical data, which may be labelled with a user identifier (e.g., to identify a particular driver associated with each data point). By training this physical condition context model, the contextual driving output platform 103 may enable output/insight generation in view of a particular context corresponding to a driver's physical condition.

At step 208, the contextual driving output platform 103 may train a personality context model (which may e.g., be part of a contextual driving model). For example, the contextual driving output platform 103 may identify a fourth subset of the historical data that is indicative of a personality/persona context (e.g., data indicating a personality based on driver social media behavior, a personality based on a historical risk score, personality test result information, and/or other personality context information), and may use this fourth subset of the historical data to train the personality context model to identify a personality context corresponding to input data (e.g., classify the fourth subset of the historical data as corresponding to the personality/persona context). In some instances, in training the personality context model, the contextual driving output platform 103 may train one or more supervised learning algorithms using the fourth subset of the historical data, which may be labelled with a user identifier (e.g., to identify a particular driver associated with each data point). By training this personality context model, the contextual driving output platform 103 may enable output/insight generation in view of a particular context corresponding to a driver's personality. In some instances, in training these modules at steps 205-208, the contextual driving output platform 103 may use data from drivers and/or passengers.

At step 209, the contextual driving output platform 103 may store a contextual driving model, which may include the trip context model, the device interaction context model, the physical condition context model, the personality context model, and/or other contextual models. In doing so, the contextual driving output platform 103 may store a machine learning model that may enable future use of the device interaction context model, the physical condition context model, the personality context model, and/or other contextual models for a holistic contextual evaluation of a particular driving scenario (e.g., based on input data). In some instances, the contextual driving output platform 103 may store the contextual driving model along with various weight values that should be applied to each of the device interaction context model, the physical condition context model, the personality context model, and/or other contextual models during application of the contextual driving model. In some instances, these weight values may be predetermined and/or dynamic (e.g., selected based on amounts of input data for each model in a particular situation, or the like).

Referring to FIG. 2C, at step 210, the first computing device 105 and/or the second computing device 106 may collect new data. For example, the first computing device 105 and/or the second computing device 106 may collect new data that is similar in nature to the historical data described above (e.g., data indicating one or more of: frequency, number, and/or type of difficult driving maneuvers on a route, other drivers' behavior on a trip, driving speed, car movement/stoppage information, road situations (e.g., under construction, or the like), road type, route (local or speedways), trip duration (long, medium, or short), time of day/night, traffic information, weather information, braking information, type of device interactions (e.g., cell phone, GPS device, car Bluetooth phone, laptop, tablet, or the like), type of applications interacted with (e.g., Facebook, TikTok, WhatsApp, or the like), types of interaction within applications (e.g., post, message, tweet, camera, voice call, video chat, or the like), frequency of device interactions, sleep scores, special conditions like physical disabilities (e.g., reported by a driver), driver vital signs (e.g., blood pressure, temperature, or the like), a personality trait, characteristic, and/or attribute (e.g., a full personality or a personality type) based on driver social media behavior (e.g., personality may reflect the way people behave in social media and in real life), a historical risk score, personality traits (e.g., driving style may be influenced by their personality traits as defined by a personality test/evaluation such as Big Five, Myers Briggs, or the like), and/or other contextual information). In some instances, in collecting the new data, the first computing device 105 and/or the second computing device 106 may collect data corresponding to a user of the first computing device 105 and/or the second computing device 106 during a driving trip, during the course of a day, or the like. In some instances, the first computing device 105 and/or the second computing device 106 may collect data corresponding to drivers and/or passengers in different vehicles (e.g., vehicles in which the first computing device 105 or second computing device 106 are located and/or other nearby vehicles).

At step 211, the first computing device 105 and/or the second computing device 106 may establish a connection with the data source system 104. For example, the first computing device 105 and/or the second computing device 106 may establish second and third wireless data connections with the data source system 104 respectively (e.g., in preparation for sending the newly collected data). In some instances, the first computing device 105 and/or the second computing device 106 may identify whether connections are already established with the data source system 104. If connections are already established with the data source system 104, the first computing device 105 and/or second computing device 106 might not re-establish the connection. If connections are not yet established with the data source system 104, the first computing device 105 and/or second computing device 106 may establish the second and/or third wireless data connections as described herein.

At step 212, the first computing device 105 and/or second computing device 106 may send the new data to the data source system 104. For example, the first computing device 105 and/or second computing device 106 may send the new data to the data source system 104 while the second and/or third wireless data connections are established.

At step 213, the data source system 104 may receive the new data sent at step 212. For example, the data source system 104 may receive the new data while the second and/or third wireless data connections are established.

At step 214, the contextual driving output platform 103 may monitor the data source system 104 for new data. Once new data is detected (e.g., the new data received at step 213), the contextual driving output platform 103 may collect the new data and proceed to step 215 for analysis.

Figure 2D:
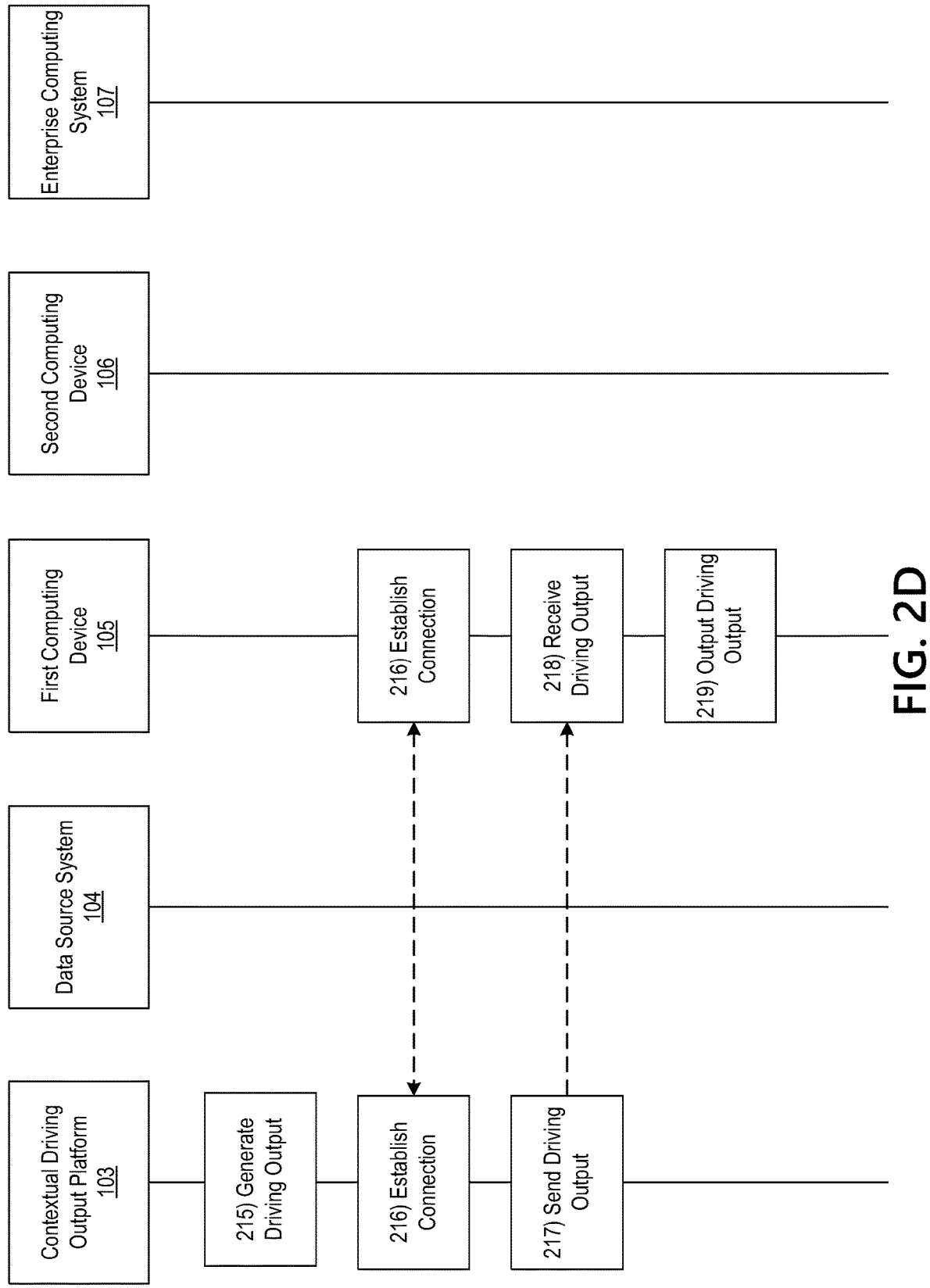

Referring to FIG. 2D, at step 215, the contextual driving output platform 103 may feed the new data into the contextual driving model, which may analyze the new data to generate a customized driving output. In some instances, the contextual driving model may identify subsets of the new data (e.g., classify the new data) corresponding to trip context, device interaction context, driver physical condition context, personality context, and/or other contexts, and may analyze these subsets of the new data using the corresponding models within the contextual driving model (e.g., the trip context model, the device interaction context model, the physical condition context model, the personality context model, and/or other contextual models). Accordingly, the contextual driving model may produce results using each of the models used to analyze the new data, and may subsequently combine the results to identify a holistic context of a particular driving scenario.

In some instances, to produce the overall contextual results, the contextual driving model may apply weight values to the results of each contextual model (e.g., (0.2*trip context output)+(0.4*device interaction context output)+ (0.9*personality context model)+(0.7*personality context output)). In some instances, these weight values may be preselected by the contextual driving output platform 103 and/or based on user input. In other instances, these weight values may be dynamic, and may be selected by the contextual driving model based on the new data (e.g., the weight value may be based on an amount of the new data corresponding to each model). For example, the weight values may be correlated with threshold levels of data, and selected by the contextual driving model based on a comparison of the new data to the threshold levels.

Based on the overall contextual results, the contextual driving model may identify a recommendation or other customized driving output (e.g., by correlating the overall contextual results to stored contextual results in the contextual driving model, and identifying customized driving outputs corresponding to these identified stored contextual results). In some instances, in generating the customized driving output, the contextual driving model may generate an audio output and/or a visual output that provides a recommendation to an individual/driver.

As a particular example, the contextual driving model may identify that in the current driving situation, a driver is making difficult maneuvers, there is deteriorating weather, and traffic is heavy. In this example, the contextual driving model may generate a different customized driving output (recommendation) than an instance in which the same driver is on the same route with no traffic and sunny weather. As another example, the contextual driving model may identify both that a driver is on a difficult route and has an underlying health condition. In this example, the contextual driving model may generate a different customized driving output than an instances where a different driver, who does not have an underlying health condition, is traveling the same route. Accordingly, it may be observed that different combinations of factors may result in varied contexts, for which unique outputs/recommendations may be provided.

In some instances, in generating the customized driving output, the contextual driving model may provide indications of how various contextual situations impact a current trip (or may impact a future trip e.g., for trip planning). Additionally or alternatively, in generating the customized driving output, the contextual driving model may provide indications of how a driver may avoid delays/incidents during a driving trip (e.g., accidents are more frequent on a particular route under these conditions, or the like).

In some instances, in generating the customized driving output, the contextual driving model may provide a trips feedback report, which may include various context matrices, charts, and/or other information indicating recommendations for future trips based on a driver's performance in a particular context. Additionally or alternatively, this feedback may be provided in real time during a driving trip.

In some instances, in generating the customized driving output, the contextual driving model may generate a customized driving output based on a hypothetical future trip (e.g., if I drive from New York to Chicago, what is my risk of an accident dependent on various contexts). In some instances, in generating the customized driving output, the contextual driving model may provide educational/training experience to recommend particular driving styles to student drivers and/or unfamiliar drivers (e.g., driving in a foreign country and used to driving on the other side of the road). For example, the contextual driving model may provide recommendations on driving style, estimate risk, and/or provide feedback for these individuals.

In some instances, in generating the customized driving output, the contextual driving output platform 103 may provide a customized driving output for a first driver based on real time contextual data for a second (e.g., nearby) driver who may be within a predetermined distance of the first driver. For example, the contextual driving output platform 103 may identify (e.g., based on social media data for the second driver), that the second driver has a corresponding personality score indicating that he or she may be an aggressive individual, and thus may generate a customized driving output indicating that the first driver should change lanes to avoid the second driver. Similarly, the contextual driving output platform 103 may use video footage of another driver to identify that the other driver may be reckless, and thus that an avoidance maneuver should be performed. Furthermore, the contextual driving output platform 103 may take into account how the first driver reacts in the context of being within a predetermined proximity of an aggressive driver (e.g., does the first driver become anxious, make avoidance maneuvers, or the like).

At step 216, the contextual driving output platform 103 may establish a connection with the first computing device 105. For example, the contextual driving output platform 103 may establish a fourth wireless data connection with the first computing device 105 to link the contextual driving output platform 103 to the first computing device 105 (e.g., in preparation for sending the customized driving output generated at step 215). In some instances, the contextual driving output platform 103 may identify whether or not a connection is already established with the first computing device 105. If a connection is already established with the first computing device 105, the contextual driving output platform 103 might not re-establish the connection. If a connection is not yet established with the first computing device 105, the contextual driving output platform 103 may establish the fourth wireless data connection as described herein.

At step 217, the contextual driving output platform 103 may send the customized driving output to the first computing device 105. For example, the contextual driving output platform 103 may send the customized driving output to the first computing device 105 via the communication interface 113 and while the fourth wireless data connection is established. In some instances, the contextual driving output platform 103 may send one or more commands directing the first computing device 105 to output the customized driving output.

At step 218, the first computing device 105 may receive the customized driving output send at step 217. For example, the first computing device 105 may receive the customized driving output while the fourth wireless data connection is established. In some instances, the first computing device 105 may also receive the one or more commands directing the first computing device 105 to output the customized driving output.

At step 219, based on or in response to the one or more commands directing the first computing device 105 to output the customized driving output, the first computing device 105 may output the customized driving output. For example, the first computing device 105 may cause an audio and/or visual output of the customized driving output. In some instances, the first computing device 105 may display a graphical user interface similar to graphical user interface 405, which is illustrated in FIG. 4. For example, the first computing device 105 may display an indication that a nearby vehicle has been flagged as dangerous based on a contextual analysis of the corresponding driver, and that a maneuver should be implemented to avoid this vehicle. Additionally or alternatively, the first computing device 105 may display a color coded map that illustrates risk associated with various route options (e.g., green is least risky, yellow is medium risk, red is most risky, or the like).

Figure 2E:
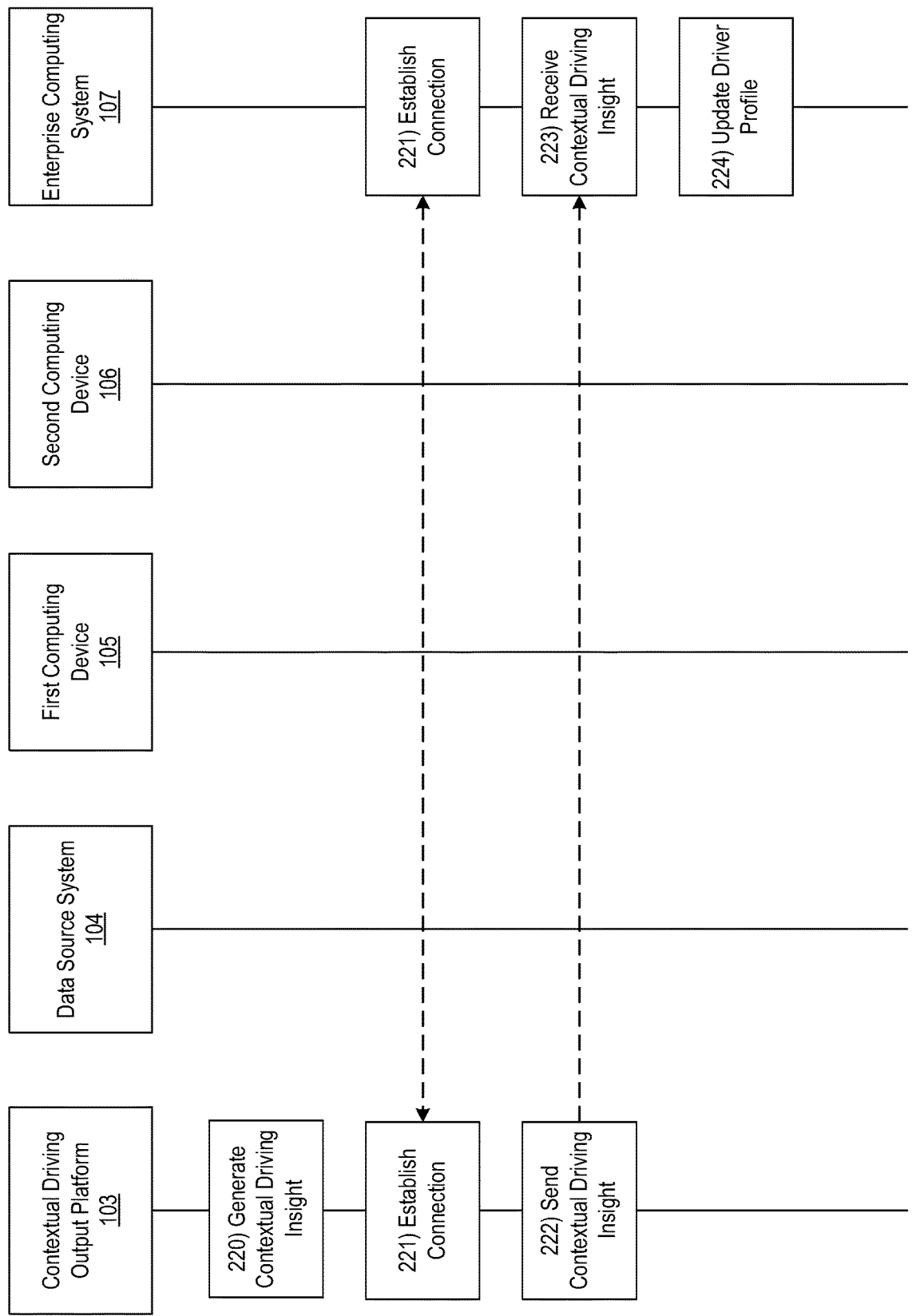

Referring to FIG. 2E, at step 220, the contextual driving output platform 103 may generate one or more contextual driving insights. In some instances, the contextual driving output platform 103 may generate the one or more contextual driving insights using the contextual driving model. In these instances, the contextual driving output platform 103 may generate the one or more contextual driving insights based on the new data and/or information indicating a response to the customized driving output (e.g., did the driver comply with the recommendation presented in the customized driving output). In generating the one or more contextual driving insights, the contextual driving output platform 103 may generate information related to a modification of an insurance rate/premium, and/or another financial incentive. For example, if the driver complied with the customized driving output, the contextual driving output platform 103 may generate one or more contextual driving insights indicating that a premium should be reduced, whereas if the driver did not comply with the customized driving output, the contextual driving output platform 103 may generate one or more contextual driving insights indicating that a premium should be increased. In some instances, the driver compliance with the customized driving output may offset an insight generated based on the new data. For example, if the new data indicates that the driver performed erratic braking, which may otherwise cause an increase in rates, information indicating that the erratic braking was in response to a customized driving output provided by the contextual driving output platform 103 may offset the new data (e.g., rates might not increase because the driver was merely following a provided recommendation). In some instances, in generating the one or more contextual driving insights, the contextual driving output platform 103 may generate one or more messages that include information as described above. Additionally or alternatively, in generating the one or more contextual driving insights, the contextual driving output platform 103 may generate one or more commands that direct the enterprise computing system to adjust a user profile based on the information described above.

At step 221, the contextual driving output platform 103 may establish a connection with the enterprise computing system 107. For example, the contextual driving output platform 103 may establish a fifth wireless data connection with the enterprise computing system 107 to link the contextual driving output platform 103 to the enterprise computing system 107 (e.g., in preparation for sending the contextual driving insights). In some instances, the contextual driving output platform 103 may identify whether or not a connection is already established with the enterprise computing system 107. If a connection is already established, the contextual driving output platform 103 might not re-establish the connection. If a connection is not yet established, the contextual driving output platform 103 may establish the fifth wireless data connection as described herein.

At step 222, the contextual driving output platform 103 may send the contextual driving insight to the enterprise computing system 107. For example, the contextual driving output platform 103 may send the contextual driving insight to the enterprise computing system 107 via the communication interface 113 and while the fifth wireless data connection is established. In some instances, the contextual driving output platform 103 may send one or more commands directing the enterprise computing system 107 to update a driver profile based on the contextual driving insight and/or to display the contextual driving insight.

At step 223, the contextual driving output platform 103 may receive the contextual driving insight sent at step 222. For example, the contextual driving output platform 103 may receive the contextual driving insight while the fifth wireless data connection is established. In some instances, the contextual driving output platform 103 may also receive the one or more commands directing the enterprise computing system 107 to update a driver profile based on the contextual driving insight and/or to display the contextual driving insight.

At step 224, based on or in response to the one or more commands directing the enterprise computing system 107 to update a driver profile based on the contextual driving insight and/or to display the contextual driving insight, the enterprise computing system 107 may update the driver profile and/or display the contextual driving insight. For example, the enterprise computing system 107 may automatically update a premium, rate, or other financial incentive associated with the driver profile. Additionally or alternatively, enterprise computing system 107 may display the contextual driving insight (e.g., to an employee of an enterprise organization, such as an insurance institution). For example, the enterprise computing system 107 may display a graphical user interface similar to graphical user interface 505, which is shown in FIG. 5. For example, the enterprise computing system 107 may display an interface indicating that although driving data suggests that a rate or premium should be increased, the rate or premium should actually be decreased because the corresponding driver complied with a customized driving output (e.g., a recommendation).

Referring to FIG. 2F, at step 225, the contextual driving output platform 103 may update the contextual driving model using the new data. For example, the contextual driving output platform 103 may refine/optimize any of the models comprising the contextual driving model based on the new data so as to increase accuracy of the model. In some instances, the contextual driving output platform 103 may update the contextual driving model using data corresponding to the driver for which the customized driving output was generated. Additionally or alternatively, the contextual driving output platform 103 may update the contextual driving model using data corresponding to other drivers.

Although the event sequence is described with regard to first computing device 105 and second computing device 106, this is for illustrative purposes only, and any number of computing devices (each affiliated with a particular user/driver) may be implemented without departing from the scope of the disclosure presented herein. Furthermore, although the machine learning models are described herein as hosted by the contextual driving output platform 103, in some instances, the models may be hosted on the edge (e.g., on first computing device 105, second computing device 106, or the like), which may enable localized processing/output generation, without departing from the scope of the disclosure presented herein.

Figure 3:
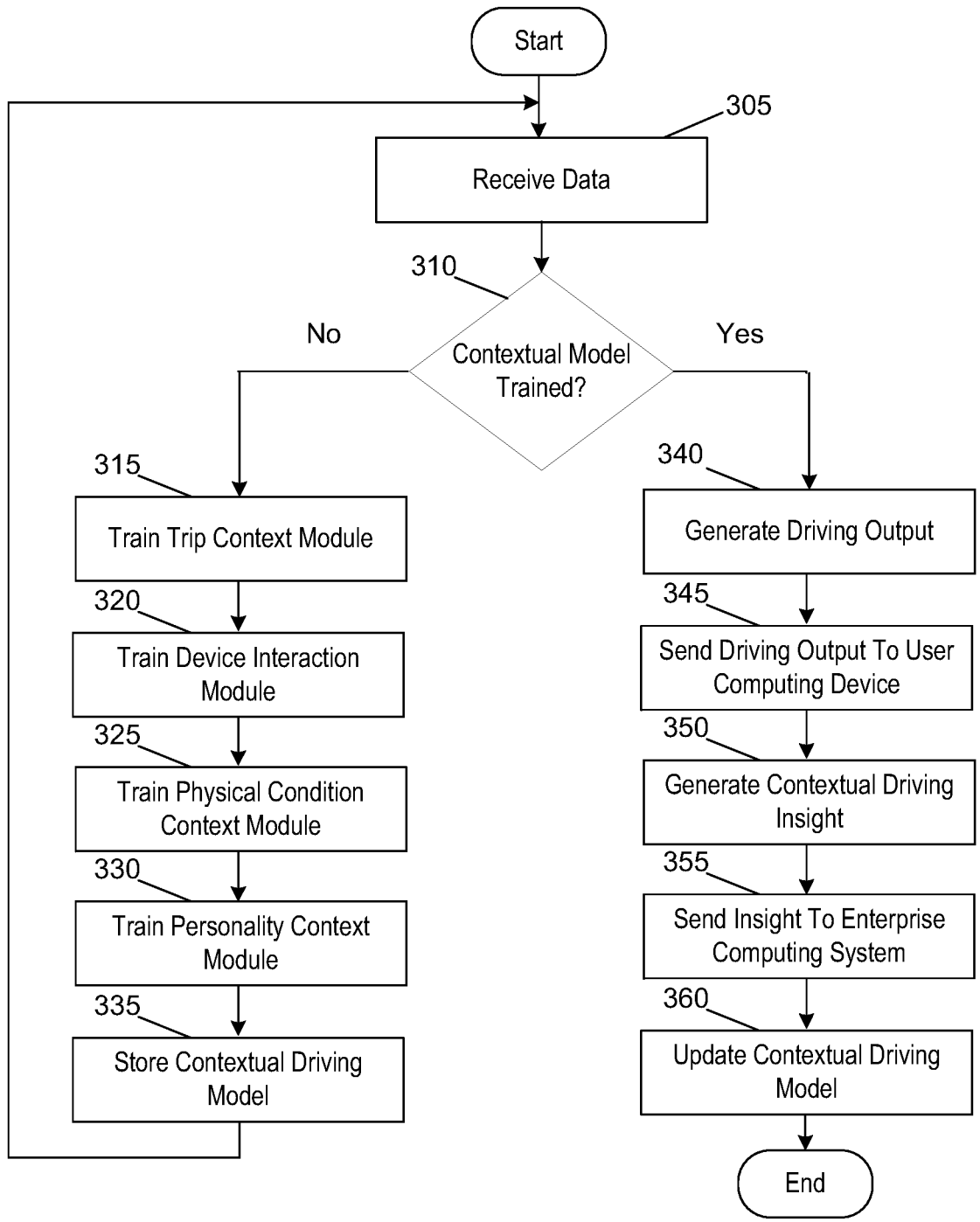
FIG. 3 depicts an illustrative method for using context based machine learning for generation of customized driving outputs in accordance with one or more example embodiments.

FIG. 3 depicts an illustrative method for using context based machine learning for generation of customized driving outputs in accordance with one or more example embodiments. Referring to FIG. 3, at step 305, a computing platform having at least one processor, a communication interface, and a memory may receive data (e.g., that may be used to provide context for a driving trip). At step 310, the computing platform may identify whether or not a contextual driving model has been trained. If the contextual driving model has not been trained, the computing platform may proceed to step 315. At step 315, the computing platform may train a trip context model to identify trip context during a driving trip. At step 320, the computing platform may train a device interaction model to identify device interaction context during a driving trip. At step 325, the computing platform may train a physical condition context model to identify physical condition of a driver during a driving trip. At step 330, the computing platform may train a personality context model to identify a personality context of drivers during a driving trip. At step 335, the computing platform may store a contextual driving model that includes the trip context model, the device interaction model, the physical condition context model, and the personality context model.

Returning to step 310, if the contextual driving model has been trained, the computing platform may proceed to step 340. At step 340, the computing platform may input data into the contextual driving model to generate a customized driving output. At step 345, the computing platform may send the customized driving output to a user computing device for output/display. At step 350, the computing platform may generate a contextual driving insight. At step 355, the computing platform may send the contextual driving insight to the user computing device for output/display. At step 360, the computing platform may update the contextual driving model based on the input data.

One or more aspects of the disclosure may be embodied in computer-usable data or computer-executable instructions, such as in one or more program models, executed by one or more computers or other devices to perform the operations described herein. Generally, program models include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program models may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
receive, from a first computing device, first data corresponding to a first driver;
receive, from a second computing device, second data corresponding to a second driver;
input the first data and the second data into a machine learning model, wherein the machine learning model is trained using historical data corresponding to a plurality of drivers or passengers;
classify the first data and the second data as corresponding to one or more of a trip context, a device interaction context, a physical condition context, or a personality context;
apply a weight to one or more of the trip context, the device interaction context, the physical condition context, or the personality context;
generate a customized driving output for the first driver based on one or more of the weighted trip context, the weighted device interaction context, the weighted physical condition context or the weighted personality context, wherein generating of the customized driving output for the first driver is based at least in part on the second data corresponding to the second driver; and cause a display of the first computing device to display the customized driving output.

2. The computing platform of claim 1, wherein training the machine learning model includes:

classifying the historical data as corresponding to one or more of the trip context, the device interaction context, the physical condition context, or the personality context corresponding to a driver or passenger; and training the machine learning model corresponding to one or more of the trip context, the device interaction context, the physical condition context, or the personality context, using the corresponding classified historical data corresponding to the plurality of drivers or passengers.

3. The computing platform of claim 2, wherein the memory stores additional computer-readable instructions that, when executed by the at least one processor, further cause the computing platform to:

identify that trip context data is not available for the first driver;

identify that the trip context is available for a passenger of a vehicle operated by the first driver;

identify that the first driver and the passenger travel together during a percentage of driving trips that exceeds a predetermined threshold; and based on identifying the percentage exceeds the predetermined threshold, use the trip context data for the passenger to train the machine learning model.

4. The computing platform of claim 1, wherein the memory stores additional computer-readable instructions that, when executed by the at least one processor, further cause the computing platform to:

send, to the first computing device, the customized driving output for the first driver and one or more commands directing the first computing device to display the customized driving output for the first driver; and send the one or more commands directing the first computing device to display the customized driving output for the first driver causes the first computing device to display the customized driving output for the first driver.

5. The computing platform of claim 4, wherein the memory stores additional computer-readable instructions that, when executed by the at least one processor, further cause the computing platform to:

receive, from the first computing device, an indication of a response to the customized driving output; and generate, using the machine learning model and based upon the response to the customized driving output, one or more contextual driving insights.

6. The computing platform of claim 5, wherein the memory stores additional computer-readable instructions that, when executed by the at least one processor, further cause the computing platform to:

send, to an enterprise computing system, the one or more contextual driving insights, wherein the one or more contextual driving insights include a modification of a rate corresponding to the first driver.

7. The computing platform of claim 1, wherein the memory stores additional computer-readable instructions that, when executed by the at least one processor, further cause the computing platform to:

update the machine learning model using at least one of the first data corresponding to the first driver or the second data corresponding to the second driver.

8. A method comprising:

at a computing platform comprising at least one processor, a communication interface, and memory:

receiving, from a first computing device, first data corresponding to a first driver;

receiving, from a second computing device, second data corresponding to a second driver;

inputting the first data corresponding to the first driver and the second data into a machine learning model, wherein the machine learning model is trained using historical data corresponding to a plurality of drivers or passengers;

classifying the first data and the second data as corresponding to one or more of a trip context, a device interaction context, a physical condition context, or a personality context;

applying a weight to one or more of the trip context, the device interaction context, the physical condition context, or the personality context;

generating a customized driving output for the first driver based on one or more of the weighted trip context, the weighted device interaction context, the weighted physical condition context, or the weighted personality context, wherein generating of the customized driving output for the first driver is based at least in part on the second data corresponding to the second driver; and causing a display of the first computing device to display the customized driving output.

9. The method of claim 8, wherein training the machine learning model further comprises:

classifying the historical data as corresponding to one or more of the trip context, the device interaction context, the physical condition context, or the personality context corresponding to a driver or passenger; and training the machine learning model corresponding to one or more of the trip context, the device interaction context, the physical condition context, or the personality context, using the corresponding classified historical data corresponding to the plurality of drivers or passengers.

10. The method of claim 9, the method further comprising:

identifying that trip context data is not available for the first driver;

identifying that the trip context is available for a passenger of a vehicle operated by the first driver;

identifying that the first driver and the passenger travel together during a percentage of driving trips that exceeds a predetermined threshold; and based on identifying the percentage exceeds the predetermined threshold, using the trip context data for the passenger to train the machine learning model.

11. The method of claim 8, the method further comprising:

sending, to the first computing device, the customized driving output for the first driver and one or more commands directing the first computing device to display the customized driving output for the first driver; and sending the one or more commands directing the first computing device to display the customized driving output for the first driver causes the first computing device to display the customized driving output for the first driver.

12. The method of claim 11, the method further comprising:
receiving, from the first computing device, an indication of a response to the customized driving output; and
generating, using the machine learning model and based upon the response to the customized driving output, one or more contextual driving insights.

13. The method of claim 12, the method further comprising:
sending, to an enterprise computing system, the one or more contextual driving insights, wherein the one or more contextual driving insights include a modification of a rate corresponding to the first driver.

14. The method of claim 8, the method further comprising:
updating the machine learning model using at least one of the first data corresponding to the first driver or the second data corresponding to the second driver.

15. One or more non-transitory computer-readable media storing instructions that, when executed by a computing platform comprising at least one processor, a communication interface, and memory, cause the computing platform to:
receive, from a first computing device, first data corresponding to a first driver;
receive, from a second computing device, second data corresponding to a second driver;
input the first data corresponding to the first driver and the second data corresponding to the second driver into a machine learning model, wherein the machine learning model is trained using historical data corresponding to a plurality of drivers or passengers;
classify the first data and the second data as corresponding to one or more of a trip context, a device interaction context, a physical condition context, or a personality context;
apply a weight to one or more of the trip context, the device interaction context, the physical condition context, or the personality context;
generate a customized driving output for the first driver based on one or more of the weighted trip context, the weighted device interaction context, the weighted physical condition context or the weighted personality context, wherein generating of the customized driving output for the first driver is based at least in part on the second data corresponding to the second driver; and
cause a display of the first computing device to display the customized driving output.

16. The one or more non-transitory computer-readable media of claim 15, wherein training the machine learning model further includes:
classifying the historical data as corresponding to one or more of the trip context, the device interaction context, the physical condition context, or the personality context corresponding to a driver or passenger; and
training the machine learning model corresponding to one or more of the trip context, the device interaction context, the physical condition context, or the personality context, using the corresponding classified historical data corresponding to the plurality of drivers or passengers.

17. The one or more non-transitory computer-readable media of claim 16 storing instructions that, when executed by the computing platform, further cause the computing platform to:
identify that trip context data is not available for the first driver;
identify that the trip context is available for a passenger of a vehicle operated by the first driver;
identify that the first driver and the passenger travel together during a percentage of driving trips that exceeds a predetermined threshold; and
based on identifying the percentage exceeds the predetermined threshold, use the trip context data for the passenger to train the machine learning model.

18. The one or more non-transitory computer-readable media of claim 15 storing instructions that, when executed by the computing platform, further cause the computing platform to:
send, to the first computing device, the customized driving output for the first driver and one or more commands directing the first computing device to display the customized driving output for the first driver; and
send the one or more commands directing the first computing device to display the customized driving output for the first driver causes the first computing device to display the customized driving output for the first driver.

19. The one or more non-transitory computer-readable media of claim 18 storing instructions that, when executed by the computing platform, further cause the computing platform to:
receive, from the first computing device, an indication of a response to the customized driving output; and
generate, using the machine learning model and based upon the response to the customized driving output, one or more contextual driving insights.

20. The one or more non-transitory computer-readable media of claim 19 storing instructions that, when executed by the computing platform, further cause the computing platform to:
send, to an enterprise computing system, the one or more contextual driving insights, wherein the one or more contextual driving insights include a modification of a rate corresponding to the first driver.

\* \* \* \* \*